United States Patent [19]
Nakajima

[11] Patent Number: 5,341,120
[45] Date of Patent: Aug. 23, 1994

[54] COMPARISON CIRCUIT

[75] Inventor: Toyokatsu Nakajima, Hyogo, Japan

[73] Assignee: Mitsubishi Denki Kabushiki Kaisha, Tokyo, Japan

[21] Appl. No.: 872,573

[22] Filed: Apr. 23, 1992

[30] Foreign Application Priority Data

Apr. 23, 1991 [JP] Japan .................................. 3-119387

[51] Int. Cl.[5] ........................... G05B 1/03; G06F 7/02
[52] U.S. Cl. .................... 340/146.2; 307/355; 307/360
[58] Field of Search ....................... 307/355, 360, 362; 340/146.2

[56] References Cited

U.S. PATENT DOCUMENTS

| | | | |
|---|---|---|---|
| 3,961,271 | 6/1976 | Zlydak et al. | 307/360 |
| 4,100,534 | 7/1978 | Shifflet, Jr. | 340/146.2 |
| 4,110,737 | 8/1978 | Fahey | 340/146.2 |
| 4,161,700 | 7/1979 | Fujikata | 307/360 |
| 4,336,593 | 6/1982 | Takase | 340/146.2 |
| 4,528,591 | 7/1985 | Liepe et al. | 307/360 |
| 5,073,724 | 12/1991 | Fox | 307/360 |

OTHER PUBLICATIONS

*DE-Elektronik*, 1976, Heft 5, S. 75 bis 76.

*Primary Examiner*—John Zazworsky
*Attorney, Agent, or Firm*—Townsend and Townsend Khourie and Crew

[57] ABSTRACT

An analog input is compared with a comparison value by an analog comparator to set a comparison result register and comparison is automatically repeated until the value of the register coincides with the value of an expected value storing register. When the both values coincide with each other, an interrupt request signal is outputted and comparison is completed.

8 Claims, 9 Drawing Sheets

COMPARISON CIRCUIT

BACKGROUND OF THE INVENTION

1. Field of the Invention

The present invention relates to a comparison circuit for outputting an interrupt request signal to the CPU (central processing unit) a single-chip microcomputer.

2. Description of the Prior Art

Figure 7:
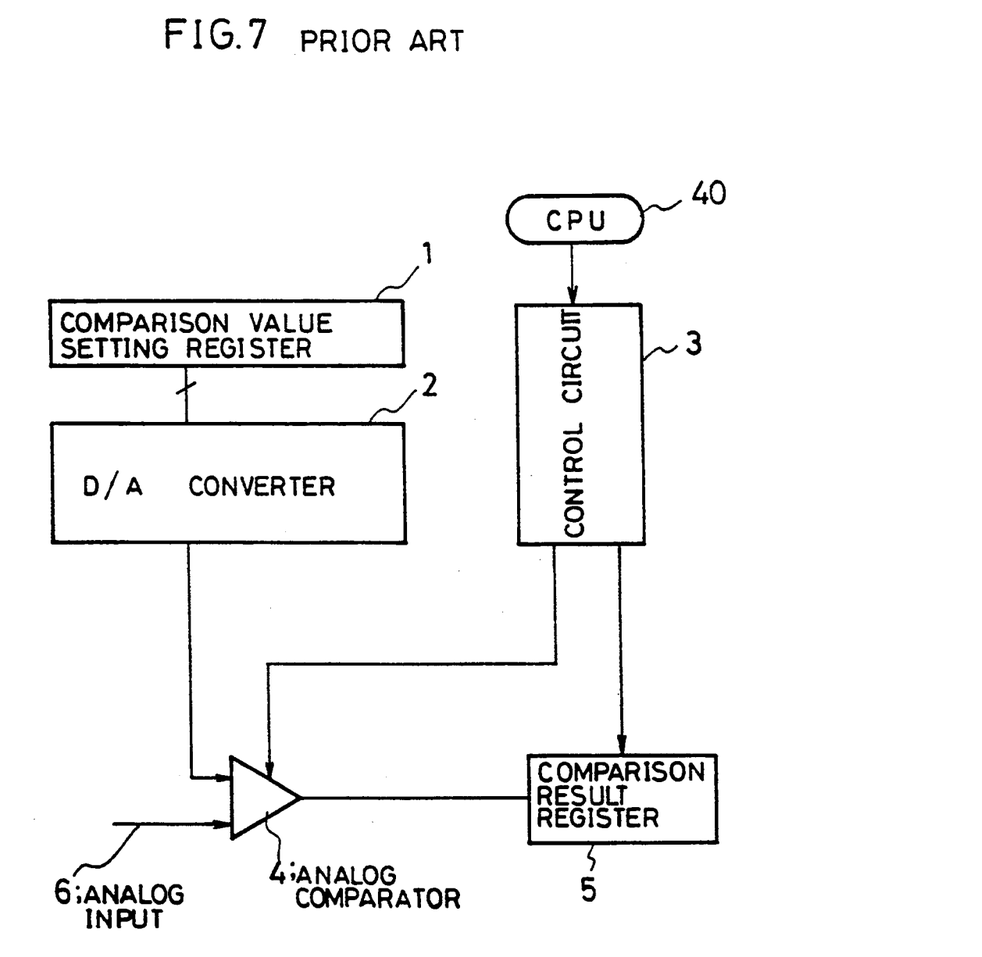
FIG. 7 is a block diagram showing an embodiment of the conventional comparison circuit.
Figure 8:
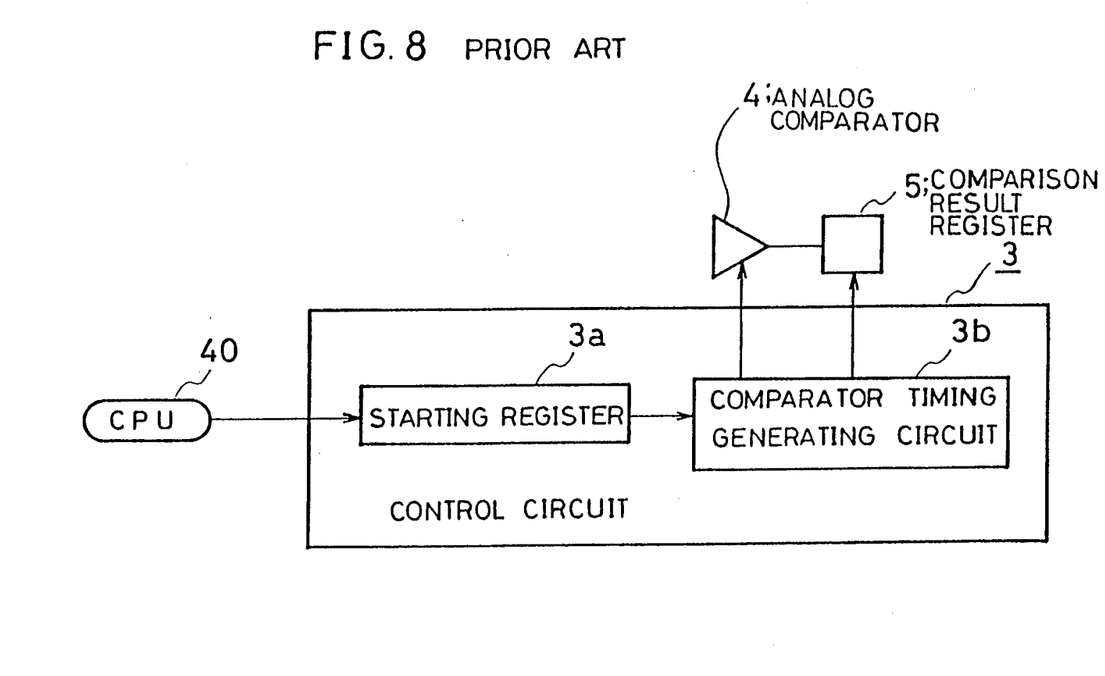
FIG. 8 is a block diagram of the control circuit in FIG. 7.

FIG. 7 shows a block diagram of the conventional general comparison circuit. In FIG. 7, numeral 1 is a comparison value setting register, 2 is a D-A (digital to analog) converter, 3 is a control circuit, 4 is an analog comparator, 5 is a comparison result register, 6 is an analog input, and 40 is a CPU. The control circuit 3, as shown in FIG. 8, consists of a starting register 3a whose set value is changed by the CPU 40 and a comparator timing generating circuit 3b controlled by the set value of the starting register 3a, which operates the analog comparator 4 and the comparison result register 5 according to the command of the CPU 40.

The following is the description of operations of the CPU 40. The digital value set to the comparison value setting register 1 is converted into an analog value by the D-A converter 2 to compare the analog voltage with the analog input 6. When the analog input is larger than the analog voltage, the comparison result register 5 is set. When the analog input is smaller than the analog voltage, the comparison result register 5 is reset. The control circuit 3 starts and ends comparison and initializes the comparison result register 5.

Figure 9:
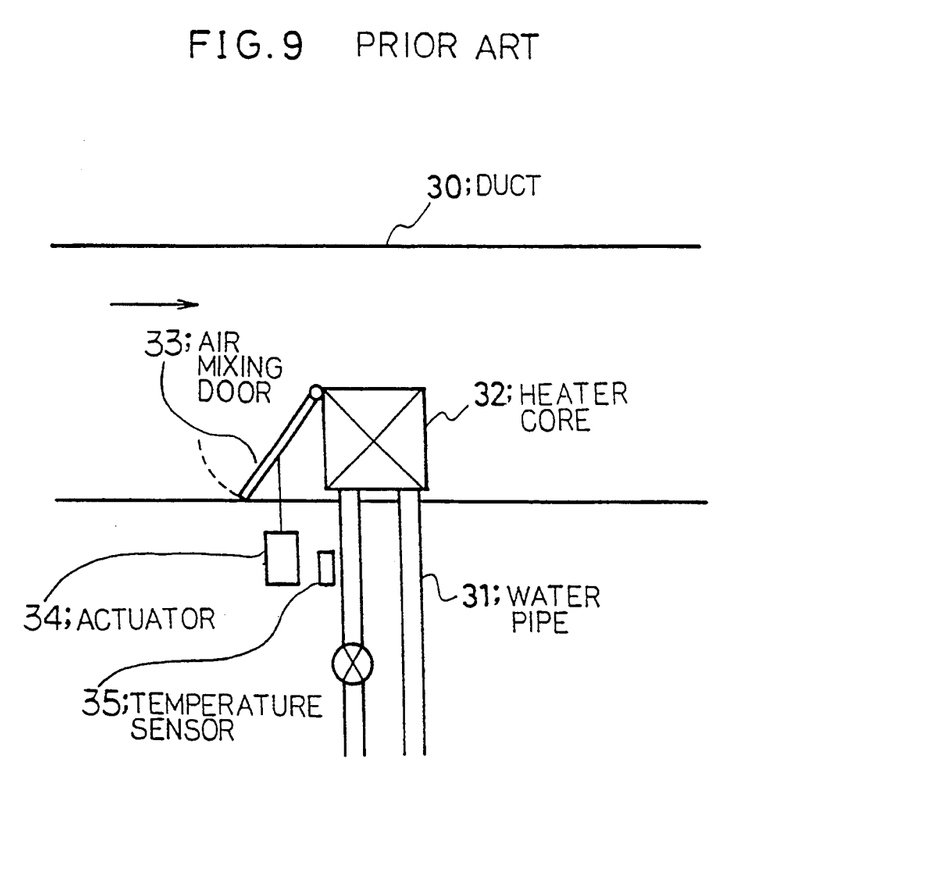
FIG. 9 is a block diagram of a control object.

The above control circuit is applied to a vehicle air conditioner shown in FIG. 9. In FIG. 9, numeral 30 is a duct for leading the air at the indoor- and outdoor-air selecting door side (upstream side) to the mode selecting door side (downstream side) on which a heater core 32 connecting with an engine cooling water pipe 31 and an air mixing door 33 are installed. The opening of the air mixing door 33 is controlled by an actuator 34. A temperature sensor 35 is adjacently installed on the water pipe 31. The temperature signal output by the temperature sensor 35 is supplied as the analog input 6.

For warming-up of the engine with the above configuration, the air mixing door 33 is opened so that cold wind does not blow off from the foot spit hole at the downstream side when the water temperature reaches, for example, 40° C. after the engine starts and hot air is blown off so that foots are not exposed to cold air when the water temperature exceeds 40° C. Therefore, after it is decided that the water temperature exceeds 40° C. by setting 40° C. to the comparison value setting register 1, the opening of the air mixing door 33 is controlled according to various conditions. Because the conventional comparison circuit has the above configuration, it is necessary for the CPU to regularly start the comparator and check comparison results. Therefore, a large program is necessary for the sequential checking and the CPU load increases for value comparison by the comparator, causing the system performance to degrade.

For the example in FIG. 9, comparison for 40° C. should be continued until the water temperature reaches 40° C. Therefore, the CPU cannot execute other jobs during the period.

SUMMARY OF THE INVENTION

The present invention is made to solve the above problem. It is an object of the present invention to provide a comparison circuit capable of decreasing the CPU load for value comparison by the comparator and improving the system performance so that the CPU can execute other jobs during comparison by the comparator.

The comparison circuit related to the present invention comprises an analog comparator for comparing a comparison value with an external analog input; a comparison result register to be set according to the output of the analog comparator; and a control circuit for controlling the analog comparator and the comparison result register, in which the control circuit is driven by a timer for dividing the clock signal into constant cycles to operate the analog comparator and comparison result register every constant cycle; an expected value storing register for storing an expected value; and a comparator for outputting an interrupt :request signal to the CPU when the output of the comparison result register coincides with the expected value of the expected value storing register.

The above and other objects, features, and advantages of the invention will become more apparent from the following description when taken in conjunction with the accompanying drawings.

DESCRIPTION OF THE PREFERRED EMBODIMENT

Figure 1:
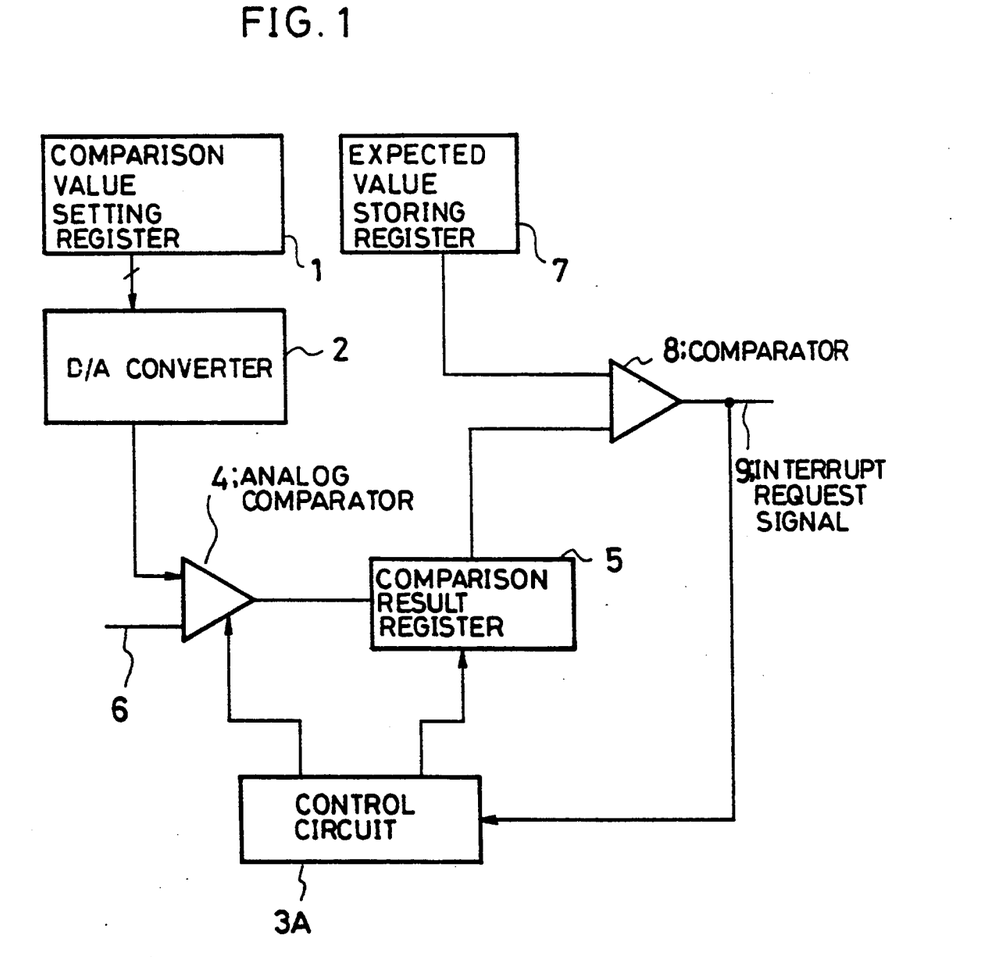
FIG. 1 is a block diagram showing an embodiment of the comparison circuit of the present invention.
Figure 2:
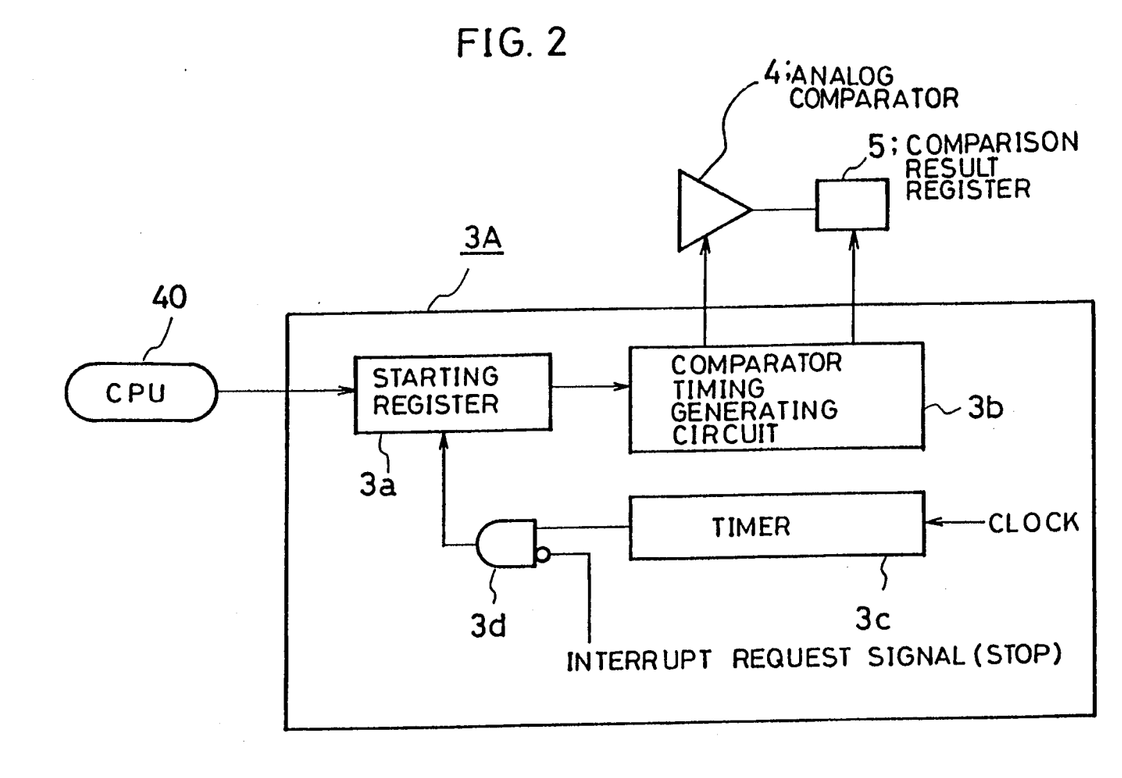
FIG. 2 is a block diagram of the control circuit in FIG. 1.

The following is the description of an embodiment of the present invention according to drawings. In FIG. 1, numeral 1 is a comparison value setting register, 2 is a D-A converter, 3A is a control circuit, 4 is an analog comparator, 5 is a comparison result register for latching the comparison result by the analog comparator 4, 6 is an analog input, 7 is an expected value storing register for storing an expected value, 8 is a comparator, and 9 is an interrupt request signal. The control circuit 3A, as shown in FIG. 2, consists of a starting register 3a whose set value is changed by the CPU 40, a comparator timing generating circuit 3b controlled by the set value of the starting register 3a, a timer 3c for dividing a clock into constant cycles, and an AND gate 3d for inputting the output of the timer 3c and the inverted interrupt request signal 9 and for enabling the starting register 3a to output its stored value when the output of the timer 3c is set and the interrupt request signal is reset. The values in the registers 1, 3a, and 7 can be changed by the CPU 40.

The following is the description of operations. The digital value set to the comparison value setting register 1 is converted into an analog value by the D-A converter 2. In this case, because the control circuit 3A is started, the comparison signal of the analog comparator 4 and the data latching signal of the comparison result register 5 are output ted by the comparator timing generating circuit 3b.

In the analog comparator 4, the analog voltage (analog comparison value) from the D-A convert is compared with the analog input 6 and, when the analog input 6 is larger than the analog voltage, "1" is output. The comparison result register 5 latches the data. Therefore, when "1" is previously stored in the expected value storing register 7, the interrupt request signal is output from the comparator 8. In the control circuit 3A, the starting register 3a is disabled by the interrupt request signal and the next comparison is not executed.

When the analog input is smaller than the analog voltage, the analog comparator 4 is automatically started by the control circuit 3A because the comparison result does not coincide with the expected value. This operation is repeated until the both values coincide with each other. During the above period, the CPU 40 load is decreased because it does not have to control the analog comparison 4 or comparison result register 5.

Because the comparison result register 5 and expected value storing register 7 consist of one bit, the hardware structure can be simplified. In FIG. 9, if the value of 40° C., for example, is set to the comparison value setting register 1 and the expected value of "1" is set to the expected value storing register 7, the CPU only has to start the control circuit 3A at the first time and, subsequently, the control circuit 3A automatically drives the analog comparison 4 and comparison result register 5. Therefore, the CPU 40 can execute other jobs during the period. When the analog input 6 reaches the value of 40° C. (that is, when the comparison result becomes "1"), the interrupt request signal 9 (stop) is outputted from the comparator 8. Thus, the CPU 40 starts controlling the air mixing door.

Figure 3:
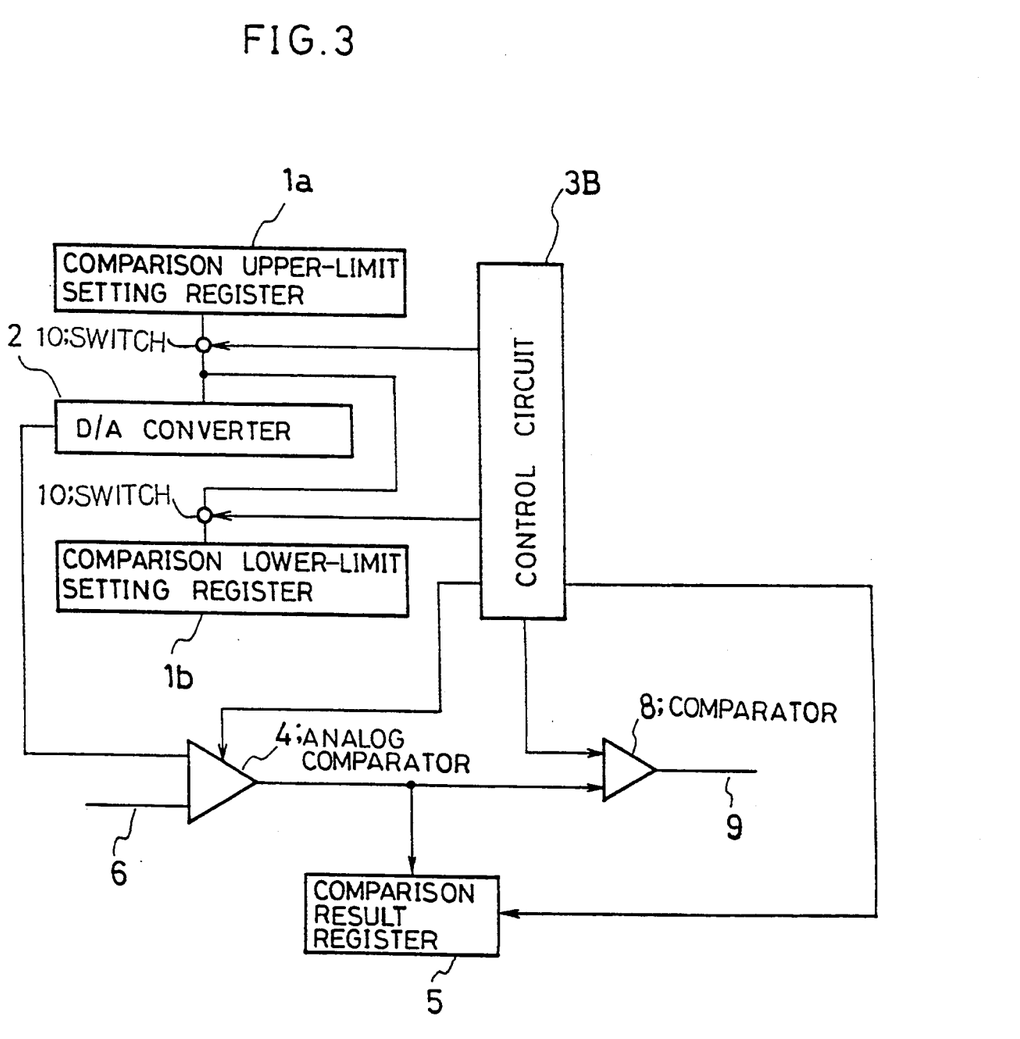
FIG. 3 is a block showing another embodiment of the present invention.
Figure 4:
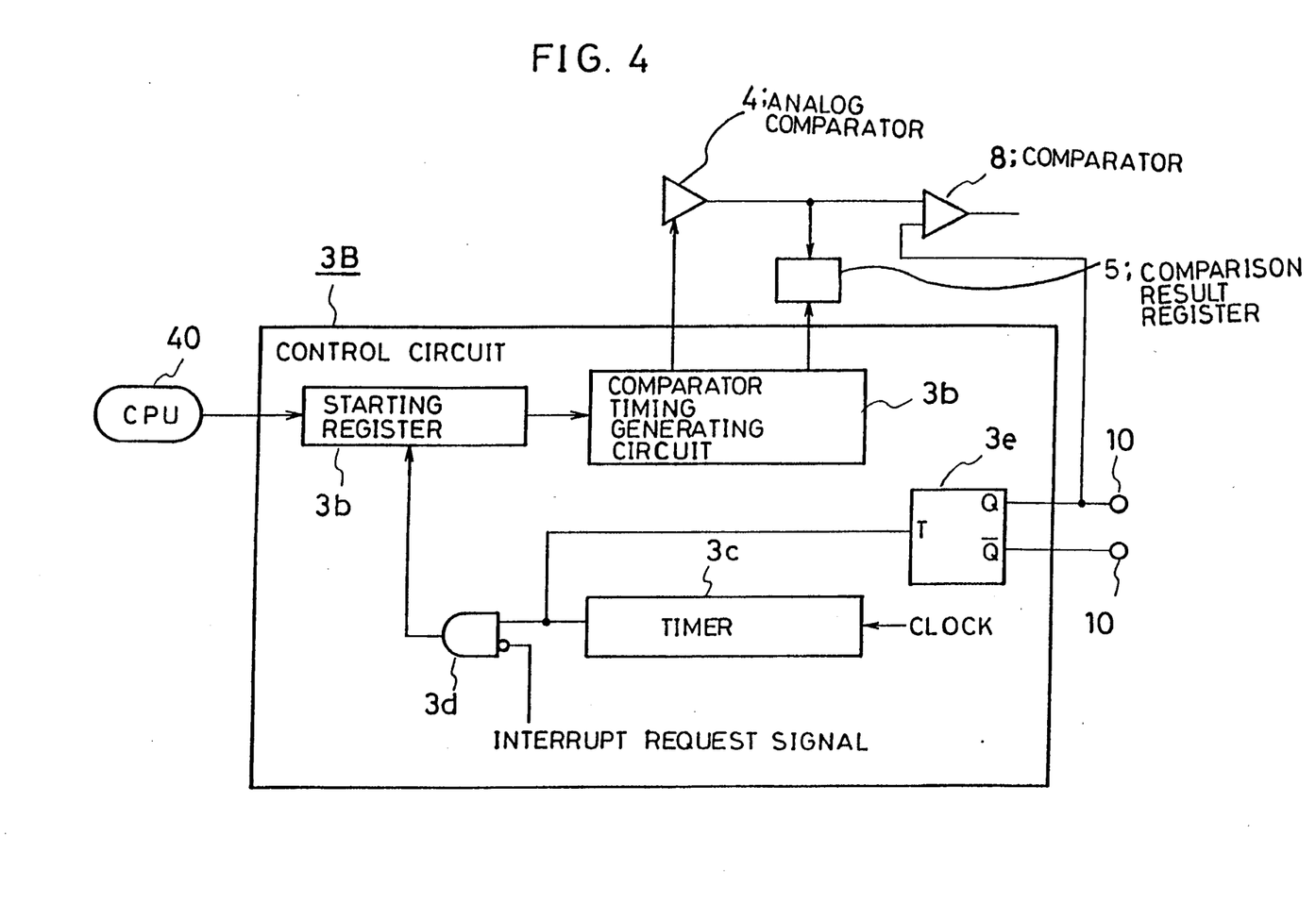
FIG. 4 is a block diagram of the control circuit in FIG. 3.

The following is the description of another embodiment of the present invention according to FIG. 3. In FIG. 3, numeral 1a is a comparison upper-limit setting register, 1b is a comparison lower-limit set,ring register, 2 is a D-A converter, 3B is a control circuit, 4 is an analog comparator, 5 is a comparison result register, 6 is an analog input, 8 is a comparator, 9 is an interrupt request signal, and 10 is a selector switch. The upper limit of any set range is stored in the comparison upper-limit setting register 1a and the lower limit of it is stored in the comparison lower-liftoff setting register 1b. The control circuit 3B, as shown in FIG. 4, is provided with a T flip flop 3e for inputting the timer dividing output whose Q output and inverse Q output divide each constant cycle into a first time interval and a second time interval, respectively, are connected to the switches 10 and 10.

The following is the description of operations. When the analog comparison 4 is started, it compares the comparison upper limit with the analog input 6 during the first time interval and with the comparison lower limit during the second time interval. This operation is repeated for following time intervals. If the analog input is larger than the upper limit or smaller than the lower limit, it is out of the set range. In this case, the expected value is reached. Therefore, the interrupt request signal is outputted from the comparator 8 to end comparison. That is, two values can be detected.

Though comparison is started from the upper limit at the first time in the above embodiment, it is also possible to start comparison from the lower limit.

The above control is used for engine control corresponding to atmospheric pressure change when a vehicle, for example, moves from a lowland to a highland or mountain through a normal position. For example, this control is effective when the jet timing is controlled depending on whether the atmospheric pressure becomes lower than the lower limit of the set range (during running at the normal position) or larger than the upper limit and it is kept constant independently of the atmospheric pressure change. That is, the load of the CPU 40 can be decreased by making the control circuit 3B decide whether or not the atmospheric pressure goes out of the upper or lower limit when it is in the set range according to this embodiment.

Figure 5:
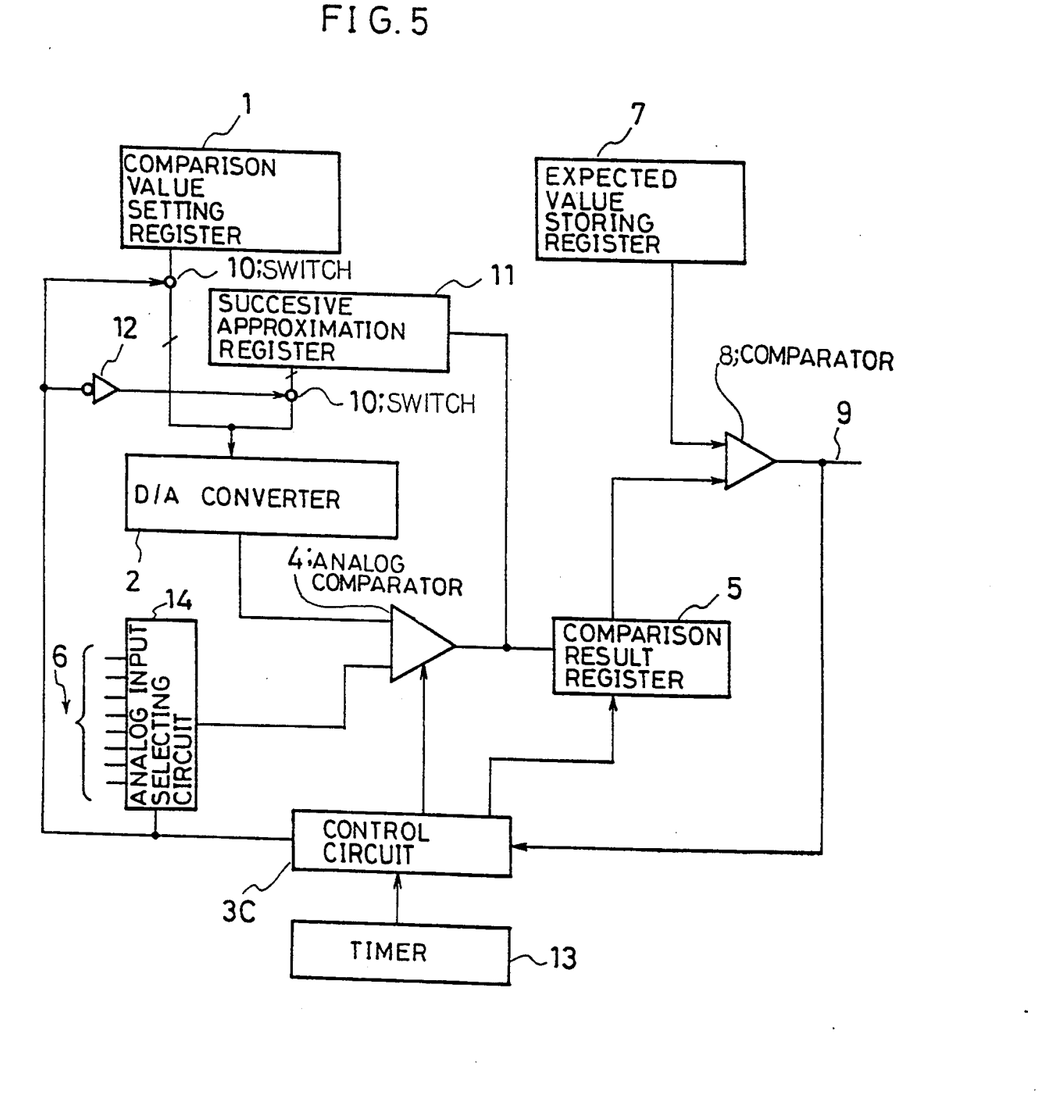
FIG. 5 is a block diagram showing still another embodiment of the present invention.

FIG. 5 shows still another embodiment related to the embodiment in FIG. 1. This embodiment realizes a comparison circuit as one of the functions of a sequential-comparison-type A-D converter. In this case, the system performance is further improved by connecting a timer 13 to the outside of a control circuit 3C. Numeral 11 is a successive approximation register, numeral 1 is comparison value setting register, 10 is a pair of switches controlled by a control signal from the control circuit 3c, with the control signal coupled to one switch 10 by inverter 12 so that either the successive approximation register 11 or comparison value setting register 1 is coupled 11 to the D-A converter 2, 14 is an analog input selecting circuit. The timer 13 divides a clock input into constant cycles and outputs a signal each cycle. The analog comparator 4 repeats comparison at the time interval set to the timer 13. When the operation of the analog comparator 4 and A-D conversion are simultaneously executed, the user can use the A-D converter independently of the operation of the comparator 4 by executing A-D conversion before starting the comparator 4. For this embodiment, the control circuit 3C is made by adding to the control circuit 3A in FIG. 1 a register for outputting the control signal to the pair of switches 10 to select the output of either the successive approximation register 11 or comparison value setting register 1 to be input to D/A converter 2 in order to implement either the A/D conversion function or the comparison function. The comparator timing generating circuit is also changed to the counter storing type.

Figure 6:
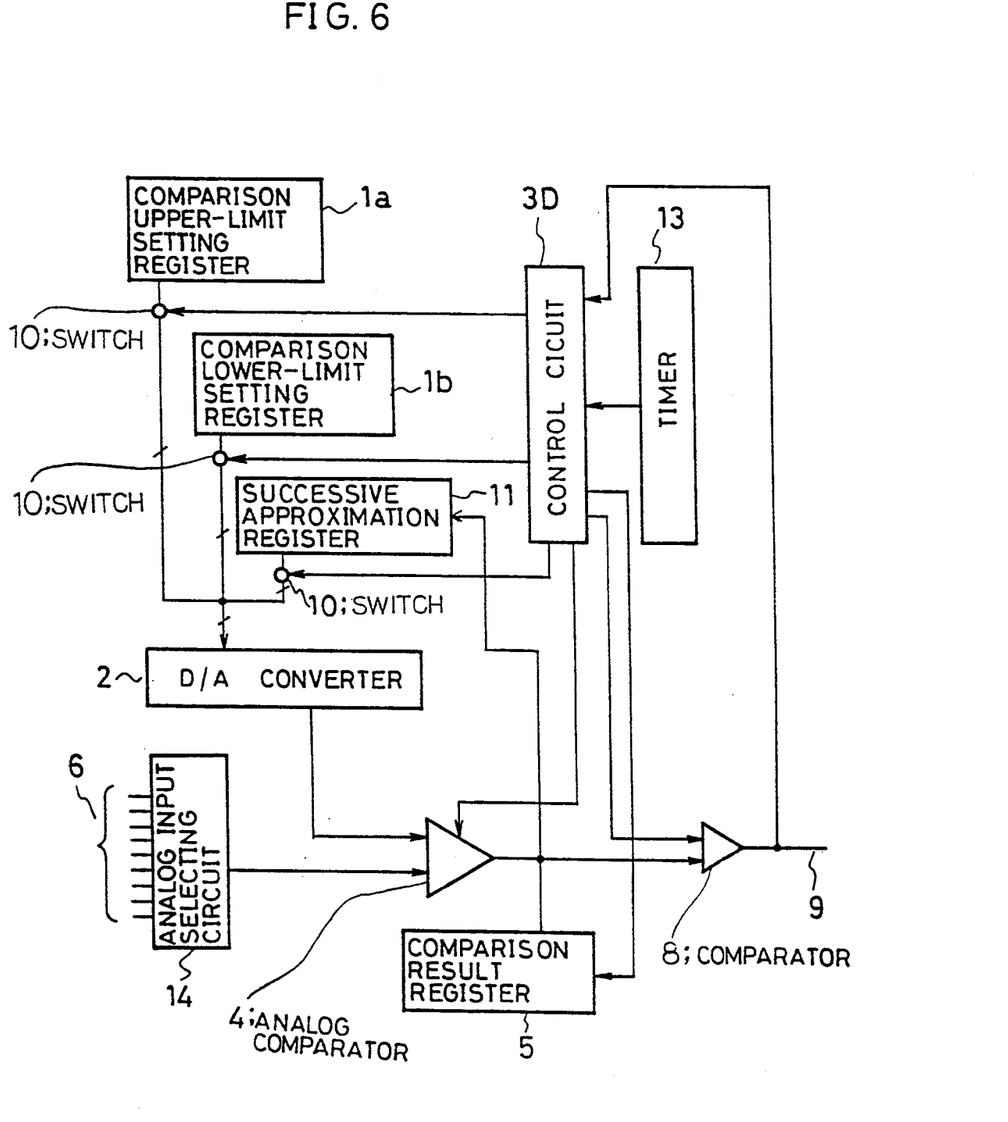
FIG. 6 is a block diagram showing still another embodiment of the present invention.

FIG. 6 shows still another embodiment related to the embodiment in FIG. 3. This embodiment realizes a comparison circuit as one of the functions of the A-D converter. For this embodiment, the control circuit 3D is made by adding an A-D converter and comparator selecting register to the control circuit 3B in FIG. 3 and changing the comparator timing generating circuit to the counter storing type.

As described above, the comparison circuit of the present invention comprises an analog comparator for comparing a comparison value with an external analog input; a comparison result register to be set according to the output of the analog comparator; a control circuit for controlling the analog comparator and comparison result register, in which the control circuit is driven by a timer to operate the analog comparison and comparison result register every a certain cycle; an expected value storing register for storing an expected value, and a comparator for outputting an interrupt request signal to the CPU when the output of the comparison result register coincides with the expected value of the expected value storing register. Therefore, the CPU load can be decreased for comparison by the comparator, the CPU can execute other jobs during the comparison, and the system performance can be improved.

What is claimed is:

1. A comparison circuit for setting an interrupt request signal provided to a CPU, comprising:

an analog comparator, coupled to receive a comparison value, an external analog input signal characterized by a magnitude value, and a comparison control signal, for comparing, when said comparison control signal is asserted, the comparison value with the magnitude value of the external analog input signal and for setting a comparator output signal when the magnitude value of the external analog input signal coincides with the comparison value;

a comparison result register, coupled to receive the output of said analog comparator and to receive a latching signal, for latching the output of the analog comparator when the latching signal is set;

a control circuit for controlling the analog comparator and comparison result register, wherein said control circuit comprises:

a timer, coupled to receive a clock signal, for dividing the clock signal into constant cycles and providing a timer output signal defining said constant cycles;

an expected value storing register for storing an expected value;

an output comparator, coupled to said expected value storing register to receive said expected value and to said comparison result register to receive the comparator output signal latched therein, for setting the interrupt request signal provided to the CPU when the comparator output signal latched in said comparison result register coincides with the expected value stored by said expected value storing register; and means, coupled to receive said interrupt request signal, said timer output signal and coupled to control said analog comparator and comparison result register, for setting said comparison control signal and said latching signal in response to said timer output signal every constant cycle when said interrupt signal is not set so that comparison circuit repeatedly compares the input signal magnitude value and comparison value until both values coincide without requiring control by the CPU.

2. A comparison circuit according to claim 1, further comprising:

an upper limit value setting register for providing a an upper limit comparison value;

a lower limit value setting register for providing a lower limit comparison value;

a switch, coupled to transfer either said upper or lower comparison value to said analog comparator according to the setting and resetting of a switch control for selecting an upper and a lower limit in an analog input set range, wherein:

said control circuit sets and resets the switch control signal during every constant cycle to alternately input the upper and lower limit input values to said analog comparator as a comparison value and the analog comparator compares the magnitude value of the analog input signal with either of the two comparison values to set or reset comparator output signal latched in the comparison result register depending on whether or not the magnitude value of the analog input signal is out of the set range.

3. A comparison circuit according to claim 1, wherein comparison values are supplied to an analog comparator from a digital-analog converter for converting the output of a comparison value setting register into an analog signal further comprising:

a comparison value setting register for storing said comparison value; and a digital-analog converter, coupling said comparison value setting register to said analog comparator, for converting the output of the comparison value setting register to an analog signal having a magnitude value equal to said comparison value.

4. A comparison circuit according to claim 1, wherein said analog comparator further comprises:

a sequential-comparison-type A-D converter consisting of an analog input selecting circuit and successive approximation register.

5. A comparison circuit according to claim 4, wherein the A-D conversion function and comparator function of the analog comparator are selected by a control circuit.

6. A comparison circuit according to claim 2, further comprising:

a digital-analog converter, coupling said switch to said analog comparator, for converting the output of the comparison value setting register to an analog signal having a magnitude value equal to said comparison value.

7. A comparison circuit according to claims 3 or 6, wherein said analog comparator further comprises:

a sequential-comparison-type A-D converter consisting of an analog input selecting circuit and successive approximation register.

8. A comparison circuit according to claim 7, wherein the A-D conversion function and comparator function of the analog comparator are selected by a control circuit.

* * * * *